United States Patent [19]

Giffhorn

[11] 4,005,572
[45] Feb. 1, 1977

[54] GAS TURBINE ENGINE CONTROL SYSTEM

[76] Inventor: William A. Giffhorn, 1101 McKinley Blvd., Miami, Okla. 74354

[22] Filed: Apr. 18, 1975

[21] Appl. No.: 569,579

[52] U.S. Cl. .......................... 60/39.28 R; 60/39.29; 60/39.66; 60/39.74 R; 415/212 R; 60/39.71
[51] Int. Cl.² ........................................ F02C 9/04
[58] Field of Search ........... 60/39.66, 39.71, 39.29, 60/39.74 R, 39.28 R

[56] References Cited
UNITED STATES PATENTS

| | | | |
|---|---|---|---|
| 2,992,529 | 7/1961 | Sampietro | 60/39.66 X |
| 3,034,298 | 5/1962 | White | 60/39.66 |
| 3,045,894 | 7/1962 | Ross | 60/39.29 X |
| 3,074,668 | 1/1963 | Frenzl | 60/39.71 X |
| 3,162,010 | 12/1964 | Mohrhauser | 60/39.71 X |
| 3,199,294 | 8/1965 | Hagen | 60/39.66 X |
| 3,266,250 | 8/1966 | Freeman | 60/39.66 X |
| 3,626,444 | 12/1971 | Caruel | 60/39.71 |
| 3,688,605 | 9/1972 | Amann | 60/39.66 X |
| 3,719,042 | 3/1973 | Chamberlain | 60/39.74 R |
| 3,899,883 | 8/1975 | Stakic | 60/39.71 |

Primary Examiner—Clarence R. Gordon
Attorney, Agent, or Firm—Head, Johnson & Chafin

[57] ABSTRACT

A gas turbine engine which comprises a rotary air compressor and a gas turbine, each with a rotor mounted on opposite ends of a rotor shaft, which is journalled in a housing positioned between the compressor and the turbine. The housing includes reduction gears. A combustion chamber is connected between the outlet air duct of the compressor and the hot gas inlet duct of the turbine. The power output is controlled by varying the air inlet to the compressor by means of an axially moving throttle control which limits the air passage into the compressor, either alone or in conjunction with variable angle compressor inlet pre-whirl vanes. It is also controlled by a shroud which surrounds the nozzle blades of the turbine. The shroud can be moved axially to limit the cross-section of flow of hot gas to the turbine blades. Auxiliary blades are mounted on the back of the turbine rotor which serves to draw cool outside air into the space between the housing and the hot gas inlet duct of the turbine, and up along the back surface of the turbine rotor, and through a plurality of axial holes drilled through the hub of the turbine rotor, all of which helps to cool the critical parts of the engine. Improved construction of the turbine rotor and the compressor rotor involves assembling the unit from a plurality of separate pieces which serve to provide a combined radial and axial flow of gases around the rotor blades. The fuel supply is controlled to be a function of the flow of air into the combustion chamber.

15 Claims, 20 Drawing Figures

GAS TURBINE ENGINE CONTROL SYSTEM

BACKGROUND OF THE INVENTION

This invention lies in the field of hot gas turbine engines. More particularly, it concerns improvements in design of turbine engines which comprise an air compressor, a turbine, and a combustion chamber connecting the compressed air outlet of the compressor, to the hot gas inlet of the turbine.

The turbine engine is well-known for its desirable properties of compactness, high power-to-weight ratio, smooth, reliable, easily silenced operation and the ability to operate at high loads for extended periods of time. The particular details of this invention show a marked improvement over the conventional design in lower manufacturing costs, increased operating flexibility and controlled response, improved fuel economy, particularly at partial loads, and minimized and simplified servicing requirements.

SUMMARY OF THE INVENTION

It is a primary object of this invention to provide an improved design of turbine engine which has increased operating flexibility and control response, lower manufacturing cost, and improved fuel economy.

These and other objects are realized, and the limitations of the prior art are overcome in this invention by controlling the power output of the engine by control of the air inlet to the compressor and by control of the hot gas flow through the turbine nozzle. Fuel delivery is controlled by the rate of air flow from the compressor. The design is such that cool outside air is drawn into the housing at a number of points, so as to cool the engine, around the outboard bearing of the rotor shaft, the turbine inlet nozzle and the rotor of the turbine.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENTS

Figure 1:
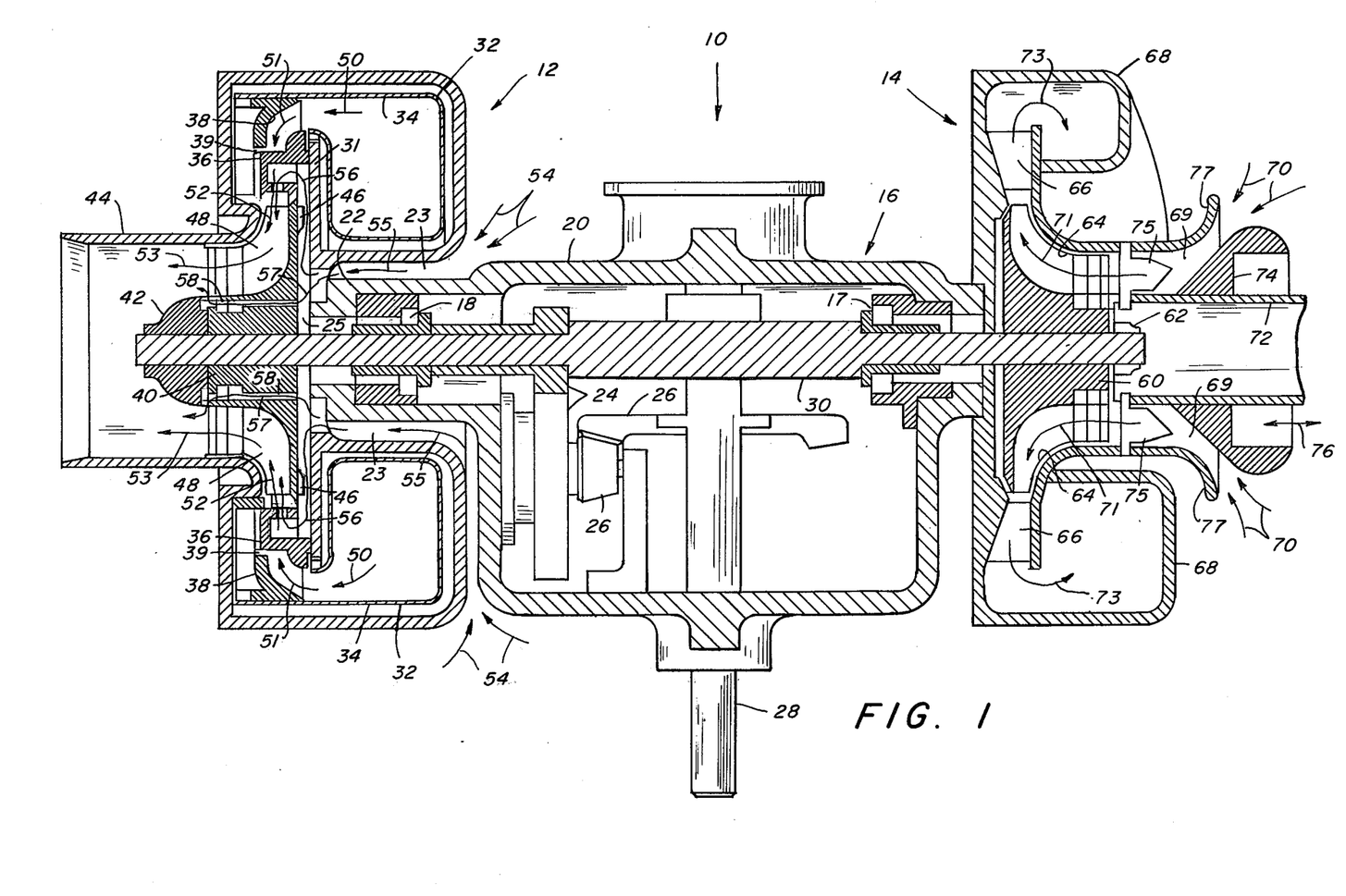
FIG. 1 is a generalized view in cross-section of the gas turbine engine.

Referring now to the drawings, and in particular to FIG. 1, there is shown, in cross-section, a view of the turbine engine indicated generally by the numeral 10. It includes a hot gas turbine, indicated generally by the numeral 12, a rotary air compressor, indicated generally by the numeral 14 and a housing and gear box, indicated generally by the numeral 16. A rotor shaft 30 is journalled in bearings 17 and 18 inside the housing 20. At the turbine end there is cylindrical extension of the housing 22 that holds bearing 18. The hot gas inlet duct 32 of the turbine surrounds the cylindrical extension 22 of the housing providing an annular passage 23.

The turbine rotor 40 is supported on the shaft 30 and locked by means 42. There is a space 25 between the back surface of the turbine rotor and the wall 31 of the hot gas inlet duct. There are auxiliary vanes 46 mounted on the back surface of the turbine rotor for the purpose of inducing an outward radial flow of air in the space 25. Thus, cool outside air flows in accordance with the arrows 54 through the annular space 23, between the cylindrical projection 22 of the housing and the hot gas inlet duct 32, and then radially outward through the space 25 in accordance with arrows 56. This cooling air then flows outwardly to the nozzles 36 of the turbine through which hot gases flow in accordance with arrows 50, 51, 52 and 53 through the blades 48 of the turbine into the outlet pipe 44 and to the turbine exhaust. The cool air as shown by arrows 56 flows into the nozzle mixing with the hot gases and diluting them to a cooler temperature as they flow through the turbine blades to the exhaust. This flow of cooling air in accordance with arrows 54, 55 and 56 cools the outboard bearing 18 of the housing and the wall of the hot air ducts 32 as well as cooling the turbine rotor along the back surface.

There are also a plurality of axial holes 58 drilled through the hub of the rotor 40 through which cool air flows in accordance with the arrows 54, 55 and 57 into the outlet pipe 44 of the turbine.

It is one of the important features of this turbine engine design to provide the cool air flow 54 so as to cool the essential parts such as the bearings and the rotor, etc. to prevent overheating and deterioration. Further details of the turbine construction will be explained in conjunction with other figures.

Referring now to the opposite end of the engine, indicated by the numeral 14, there is shown the compressor in cross-section. The compressor rotor 60 is mounted on the compressor end of the shaft 30 and is locked by means 62 to that shaft. The rotor 60 has a plurality of vanes 64. There is a flared shroud 77 at the air inlet, and the outside air flows in accordance with arrows 70 through the annular space 69 between the shroud 77 and a conical throttle piece 74, which slides axially along on axial tube 72. The annular space 69 provides air flow in accordance with arrows 70, 71 and 73. The mass flow of entering air 70 is controlled by changing the radial width of the annular space 69, by sliding the control piece or throttle inwardly or outwardly along the tube 72. The control piece 74 is conical shaped, with a central axial bore of a diameter adapted to slide freely on the tube 72, providing a streamlined flow of air between the central control piece 74 and the flare of the shroud 77. The control of the power output of the engine is by means of the control of inlet air by means of the control piece or throttle body 74.

The entering flow of air 70 is given a rotary whirl by means of plates or vanes 75, positioned in the annular space between the shroud 77 and the cylinder 72. This provides an axial helical flow of air which strikes the blades 64 of the rotor at the proper angle in accordance with the speed of rotation of the rotor. The air flow continues axially and radially outwardly in accordance with arrows 71 and 73. The flow of air from the rotor goes into the diffuser 66 which causes a reduction of kinetic energy, and converts it to potential energy or pressure inside of the outlet air duct 68. As can be seen more clearly in FIG. 2 the outlet air duct 68 is in the form of a scroll, of increasingly larger cross-section in a clockwise direction, looking at it from the inlet end of the engine. As will also be shown more clearly in FIG. 2 the largest portion of the outlet air duct is in the lower position of FIG. 2 and leads directly into the combustion chamber which will be described in connection with FIG. 2.

Within the housing 16 there is the rotor shaft 30 which supports, at opposite ends, the compressor rotor and the turbine rotor. There are reduction gears 24 and 26 which control an output shaft 28 at a selected speed reduction from that of the rotor shaft 30. Suitable bearings are provided as is well-known in the art.

Figure 2:
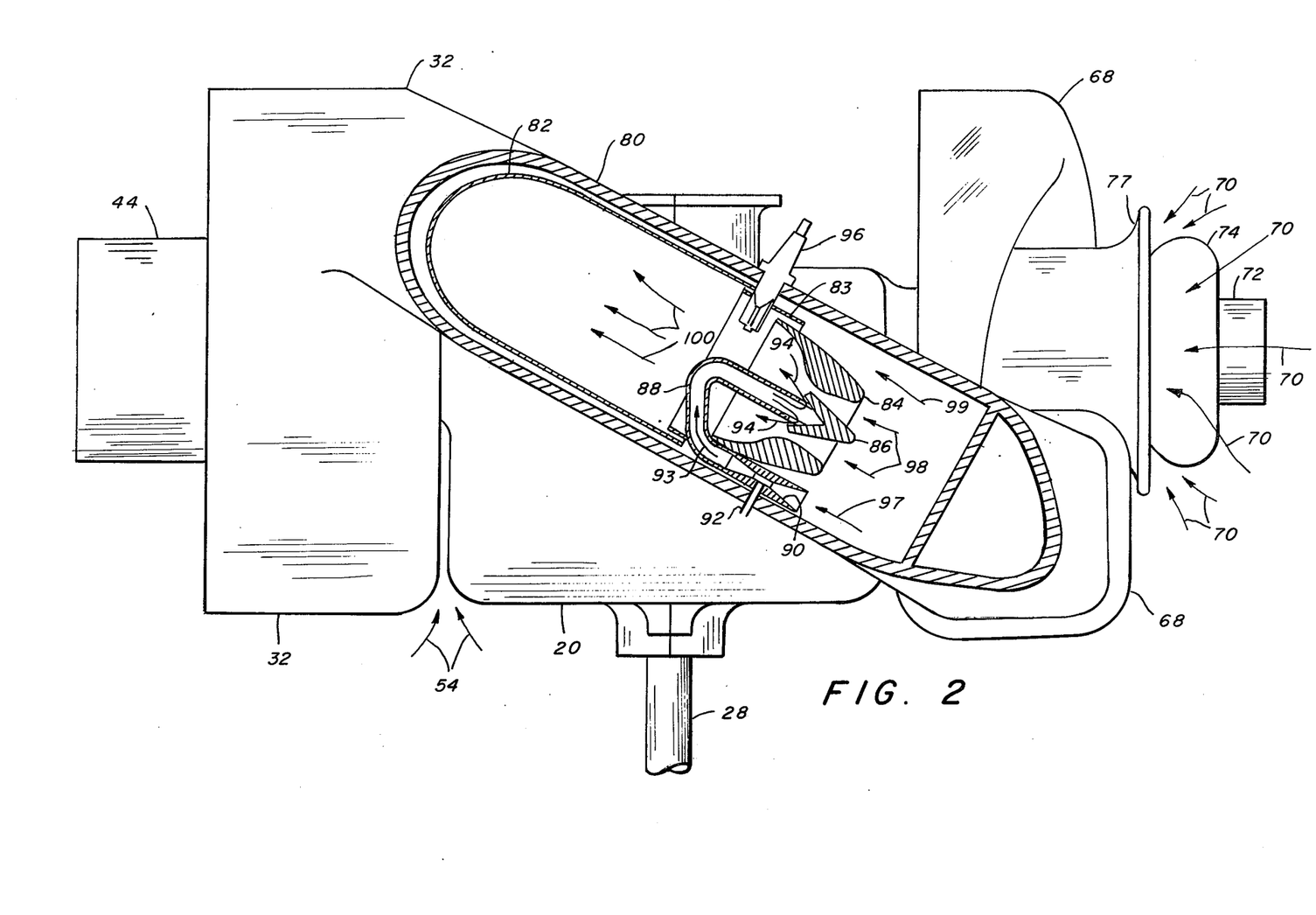
FIG. 2 is a view of the engine with a detail, in section, of the combustion chamber.

Referring now to FIG. 2, there is shown a general outline of the engine including the outlet pipe 44, the hot gas inlet duct 32, the housing 20, the compressor outlet duct 68, the inlet shroud 77 and throttle body 74.

The outlet air duct 68 of the compressor leads into the combustion chamber, which comprises a cylindrical housing 80 connecting the outlet air duct 68 to the hot compressed gas turbine inlet housing 32. The air flows from the compressor, under pressure, in accordance with the arrows 99, 98 and 97. This general flow is indicated by different arrows, since they serve slightly different purposes. The inlet fuel is provided through pipe 92 into a venturi tube 90, which leads into a pipe 88, bent in more or less the shape of a U and is directed axially upstream of the air flow 98. There is a conical shape body 86 on the end of the pipe 88, on the axis of the chamber, with means inside of the body 86 to reverse the flow of fuel, in accordance with arrows 94. There is a cylindrical body 84 surrounding the cone 86, providing an annular venturi construction for the main combustion air, as shown by arrows 98.

The fuel is supplied through pipe 92, drawn in by the reduced pressure at the neck of the venturi 90 due to the flow of compressed air 97. The fuel and air flow in accordance with arrow 93 into the region of the ignition device 96, and therefore in the space of the hot combustion process, where the fuel is vaporized, and the vaporized fuel and air mixture goes in accordance with arrows 94 downstream of the combustion chamber, mixing with the air 98. The venturi construction 84, 86 provides a reduced pressure at the outlet of the fuel tube 88 tending to accelerate flow of fuel vapor and air into the combustion zone and beyond, in accordance with arrows 100, into the hot air duct of the turbine, and then into the tubine blades and to the outlet pipe 44.

Figure 7:
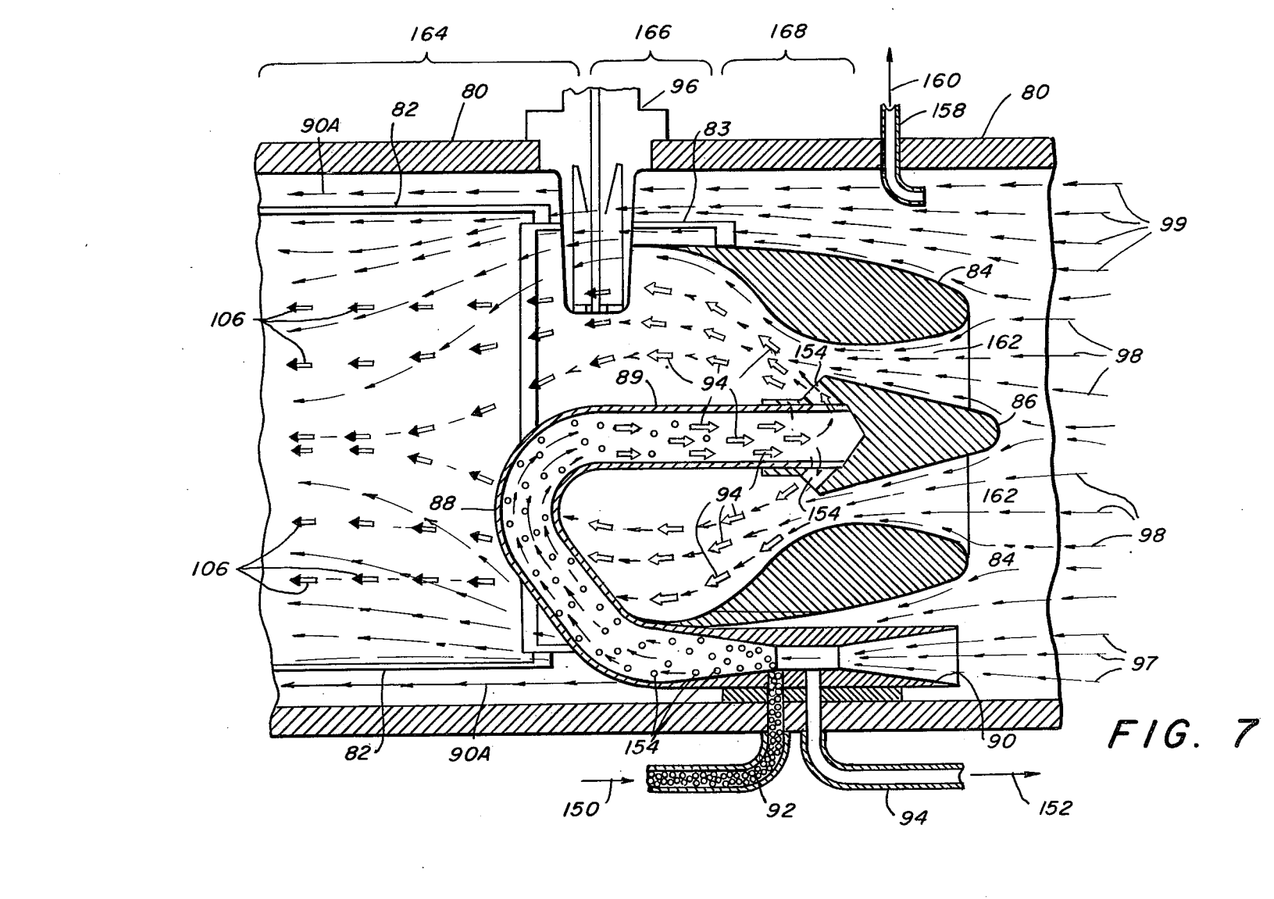
FIG. 7 illustrates in cross-section, details of the combustion chamber.

Further detail of the combustion chamber and its operation will be provided in conjunction with the description of FIG. 7.

Figures 3A, 3B, 4A:
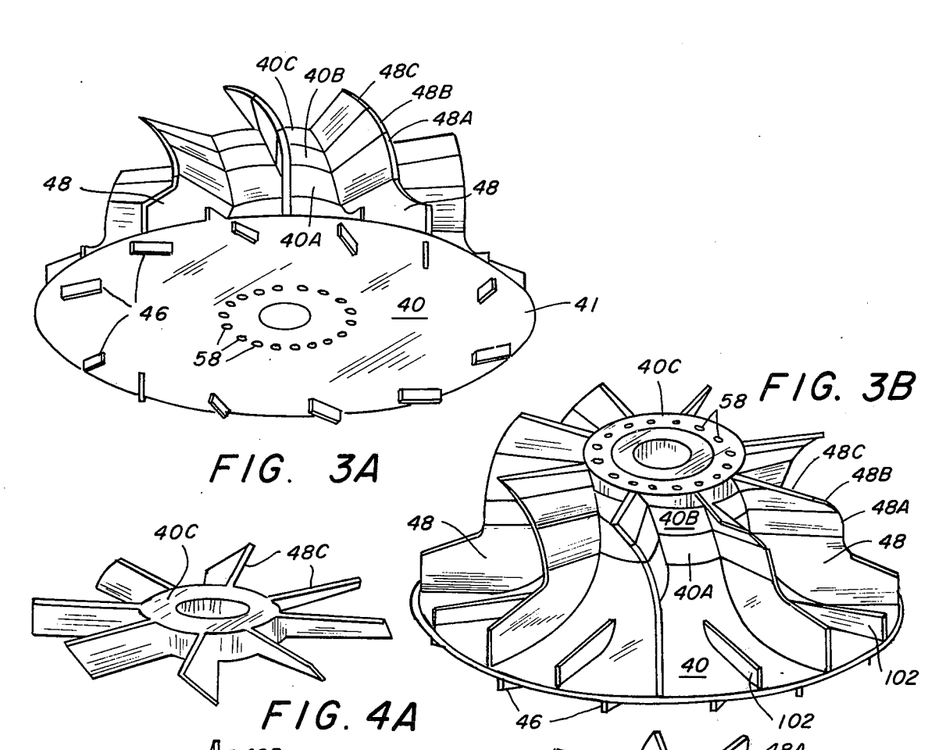
FIGS. 3A and 3B illustrate details of construction of the turbine rotor.
FIGS. 4A, 4B, 4C and 4D illustrate improvements in construction of the turbine rotor.

The construction of the turbine rotor is illustrated in considerable detail in FIGS. 3A and 3B, which show two views of the rotor. They also show an improved type of construction in which the rotor itself is made up of a base portion 40, and several adjacent portions 40A, 40B, and 40C, etc. These are clamped in an axial position. The base portion 40 uses radial vanes 48, and the auxiliary hub portions 40A, 40B, 40C are provided with integral vanes 48A, are tilted at a helical angle, which varies from the axial radial vanes 48, through a small tilt angle of the vanes 48A, a greater tilt to the vanes 48B, to a still further tilt to the vanes 48C. Thus, instead of having a continuously varying curvature to the vanes, they are made up of sub-vanes having helical curvature, and each of the added hub portions have vanes with different curvature. A continuous curvature is effectively obtained, although the construction provides more or less of a jointed plane type of construction. The details of how the vanes are manufactured will be discussed in connection with FIGS. 4A, 4B, 4C and 4D.

In the view shown in FIG. 3A which illustrates the back wall of the turbine rotor, there is clearly seen the longitudinal openings 58 bored through the central hub of the rotor in an axial direction, through which cooling air flows to keep the temperature of the turbine rotor below a damaging high temperature. There is also shown in FIG. 3A a plurality of small vanes 46 which are attached to the back face of the rotor and at such an angle that when the rotor turns a radial movement of air is provided between the back surface 41 of the rotor and the wall 31 of the hot air duct housing. This is illustrated and explained in connection with FIG. 1.

In FIG. 3B there are shown additional vanes 102 which are secondary radial vanes to improve the performance with variable area nozzle control, which will be explained further.

Figure 4B:
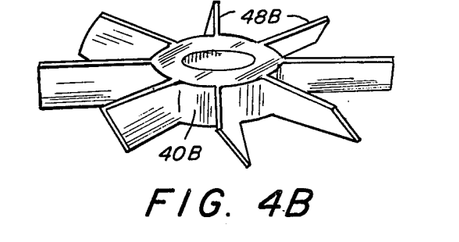
Figure 4C:
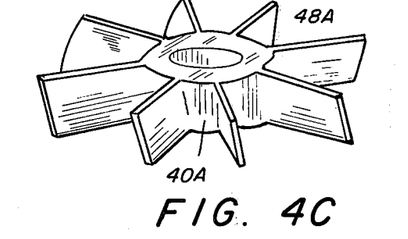
Figure 4D:
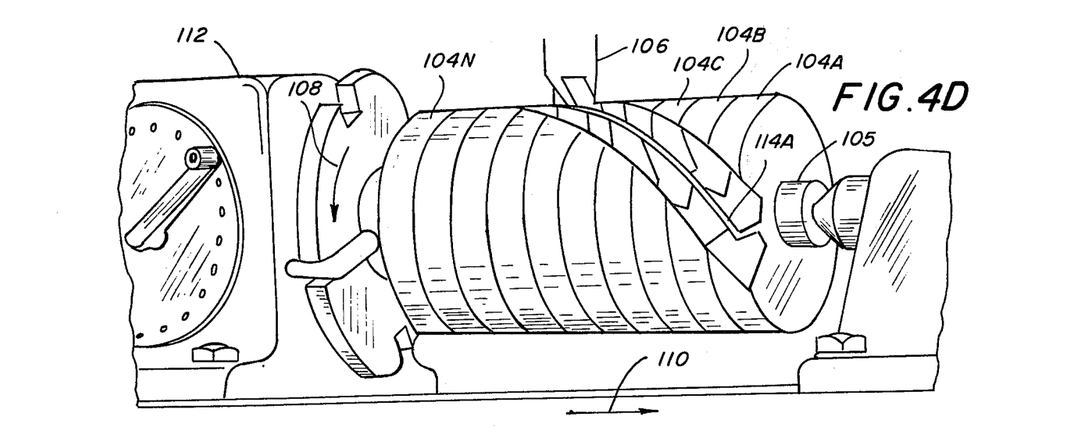
Figure 5A:
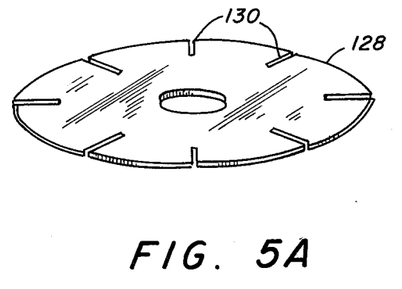
FIGS. 5A, 5B, 5C, 5D, 5E illustrate additional details of the construction of the turbine rotor.
Figure 5B:
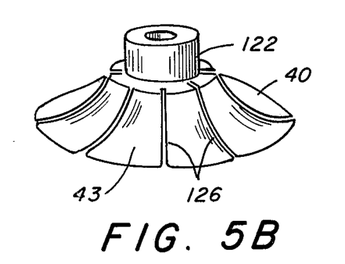
Figure 5C:
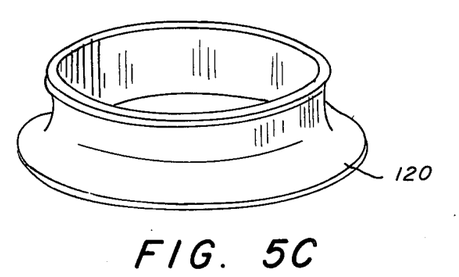
Figure 5D:
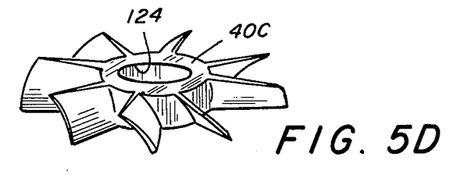

Referring now to FIGS. 4A, 4B, 4C and 4D and FIGS. 5A, 5B, 5C, 5D and 5E, there are shown details of the improved construction of the turbine rotor, and also of the compressor rotor. In FIG. 5B, for example, there is shown the rotor 40 having a flared surface 43, and a portion 122 of cylindrical form, of reduced diameter. In FIG. 5D there is shown an auxiliary hub portion 40C, having a central opening 124 which is adapted to fit over the cylindrical portion 122 of the turbine rotor. FIGS. 4A, 4B, and 4C show three different portions of the auxiliary hubs of the rotor 40A, 40B and 40C, on each of which the tilt angle of the vanes 48A, 48B and 48C are different, increasing in deflection in going from 40A, 40B, and to 40C.

In the usual construction of turbine and compressor rotors they may be cast or forged in the general shape of the final product but must be machined carefully to provide a smooth flow passage for the air or hot gas to flow. Because of the extreme difficulty of providing such a smooth machining of the curved vane surfaces, this composite construction is very satisfactory. Each of the auxiliary hubs 40A, 40B and 40C can be machined in a conventional milling machine set-up such as shown in FIG. 4D. Of course, at any one time, all of the hubs 104A, 104B, 104C to 104N are all of one angle and separate set-ups would be made as in FIG. 4D, with different vane angles to provide the three (or more) different hub units in FIGS. 4A, 4B and 4C.

As shown in FIG. 4D a group of hubs 104 are clamped on a mandrel 105 and positioned in a milling machine 112. A milling cutter 106 is provided as shown and the cut is made in a helical fashion as the cutter moves longitudinally with respect to the work, while the work rotates in accordance with arrows 108. Two cuts provide the outstanding vane 114A, and additional cuts are made around the circumference of the hub blanks 104, to make the final hub units shown in FIGS. 4A, 4B and 4C. The use of the three separate hubs 40A, 40B, 40C are shown clearly in FIG. 3B where the vanes are of increasing tilt angle.

Figure 5E:
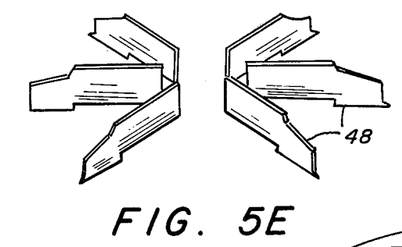

A further improvement and simplicity of construction is effected, as shown in FIG. 5E, by means of a series of fixed vanes 48 stamped or cut out of plate material. The hub 40 is machined in curved conical construction, and the cylindrical portion 122 is machined to support the three sub hubs. Radial, axial slots 126 are cut into the hub of the rotor. A backing sheet 128, FIG. 5A, is provided for the back surface of the turbine rotor, and serves to hold the bottom extensions of the radial vanes in corresponding slots 130. After the base 128 is applied to the rotor and the radial vanes 48 are inserted in position in the slots 126, then the additional hubs 40A, 40B and 40C can be positioned on the machined cylindrical surface 122, and the entire assembly then clamped longitudinally to form a unitary assembly. Some form of bonding of the several parts may be desirable, such as welding or brazing.

The addition of an optional flared shroud 126 over the outside of the vanes then provides the complete compressor or turbine assembly as the case may be.

Figure 8A:
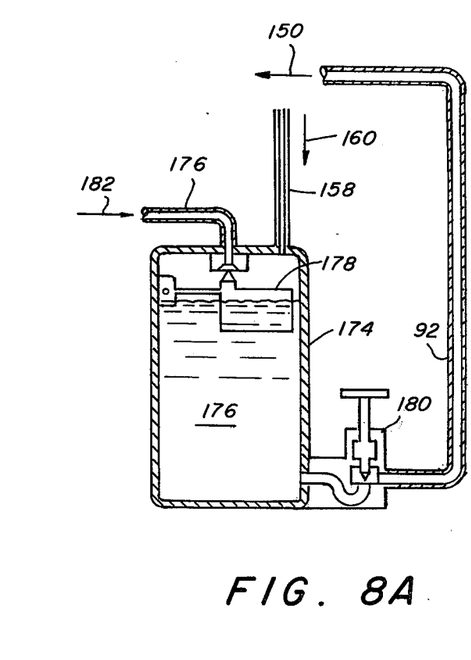
FIGS. 8A and 8B illustrate details of the fuel control to the combustion chamber.

It was pointed out in connection with FIG. 1 how the total air flow to the compressor through the inlet annular space 69 and arrows 70 can be controlled by moving the throttle member 74 inwardly or outwardly along the central axial cylinder 72. When the load output of the engine is to be reduced the throttle body 74 is moved inwardly, reducing the annular dimension of the inlet air passage, reducing the flow of air into the compressor, and therefore into the combustion chamber, and the turbine, and therefore reducing the output of the engine. As will be explained in conjunction with FIG. 8, the flow of fuel to the combustion chamber is controlled by the flow of compressed air output of the compressor, so that as the input air is throttled down, the fuel is likewise reduced in flow, and the power output of the engine is reduced. However, the efficiency is maintained high by this means of control.

In addition, it is possible to provide control of the flow of hot gases from the hot gas duct 32 through the turbine nozzles 36, and into the turbine rotor blades 48 of FIG. 1.

Figure 6A:
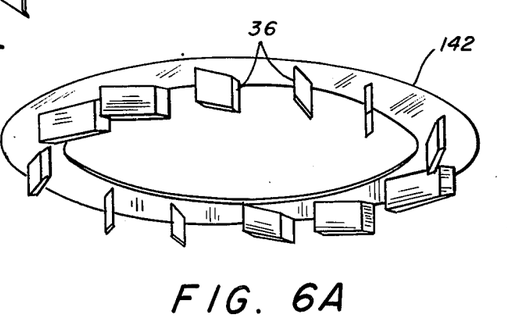
FIGS. 6A, 6B, 6C illustrate details of the turbine inlet nozzle throttling device.
Figure 6B:
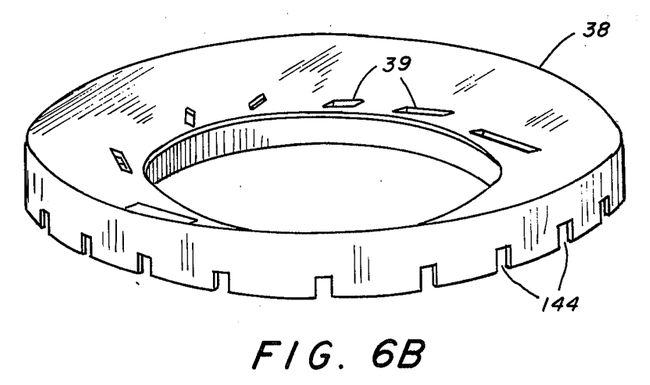
Figure 6C:
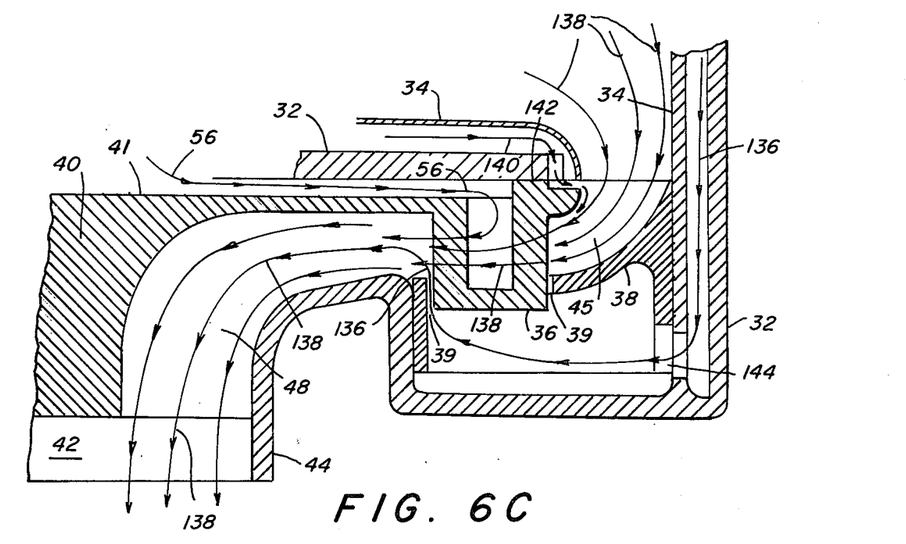

There is shown in FIGS. 6A, 6B and 6C details of the construction of the hot gas inlet control the turbine nozzles, and the means of controlling the flow of hot gases through the turbine nozzles. In FIG. 6A the turbine nozzle blades 36 are shown mounted on an annular plate 142. Correspondingly, there is a shroud 38 which controls the flow of the hot gases 50, 51 and 52, such that the axial flow of hot gas 50 is converted to a radial flow 51 (FIG. 1). The shroud 38 with its curved surface causes the hot gases then to flow between the turbine nozzle blades 36. The turbine nozzle blades serve two purposes. One is to accelerate the gases, and the other is to control the angle of discharge (with respect to the turbine wheel vanes). The gases then flow from the nozzle blades into the vanes of the turbine rotor 40. In FIG. 6B is shown a view of the shroud 38. This is built in annular construction as shown in FIG. 1, and contains a plurality of openings 39 of such a shape that there is a fit between the turbine blades 36 of FIG. 6A and the openings 39 of the shroud 38. When fitted together, as shown in FIG. 1, the shroud can be moved closer or farther away from the plate 142, thus constricting the annular passage through which the flow 51 can be made. In other words, if the total flow of air going to the compressor is reduced, then the flow of hot gases 50, 51, etc. is reduced likewise, and the shroud 38 is moved so as to reduce the inlet opening to the turbine nozzles, in order to maintain the proper high velocity of hot gas to maintain the output speed of the turbine under reduced loads.

FIG. 6C shows in greater detail a portion of the hot gas inlet to the turbine of FIG. 1 and clearly shows the path of hot gases as indicated by arrows 138 controlled by the shroud 38, to move from an axial to a radial flow, and through the space between the turbine nozzle plates 36 and into the rotor blades 48 mounted on the rotor 40. The hot gases 138 flow axially out of the outlet pipe 44. It will be seen from FIG. 6C that the turbine nozzle blades 36 pass through openings 39 in the shroud 38 and the shroud can be moved by means, not shown but well-known in the art, such as a screw or similar device, so that it can be moved axially, reducing the axial dimension of the space 45 for hot air flow into the turbine.

FIG. 6B shows a group of openings 144 around the outside surface of the shroud 38. These openings 144 are for the purpose of passing cooling air 136 in the space between the liner 34 and the housing 32 of the hot air duct. This flow of cool air 136 passes into and mixes with the flow of hot gases 138, further cooling and diluting them as they flow through the turbine blades to the outlet pipe 34.

Also shown in FIG. 6C is the flow, as indicated by arrows 56 of cool air up along the back wall 41 of the rotor and into the space between the nozzle blades and mixing with the hot gases in their flow through the turbine blades. There is also shown in FIG. 6C, flow as indicated by arrows 140 of cool air between the liner 34 and the housing 32 of the hot air duct and into the nozzle space, etc. Thus, there is considerable cooling effect in the vicinity of the turbine rotor and the hot gas duct as indicated in FIG. 1 by the flow of cooling air 54, 55, 56 and as shown in FIG. 6C of the cooling air 136 and 140 between the liner 34 and the duct housing 32.

Referring now to FIG. 7 and also to FIG. 2 there is shown in detail the construction of the combustion chamber which is installed in a cylindrical structure connecting the outlet of the compressed air duct 68, of the compressor, to the inlet of the hot duct 32 of the turbine. Greater detail is shown of the liners 82 and 83 which are provided to protect the outer housing 80 of the combustion chamber.

In the lower area of FIG. 7 there is shown a venturi tube 90 into which air, shown by arrows 97, flows from the compressor into the venturi causing a reduced pressure within the venturi which causes a flow 150 of fuel, which is indicated as liquid droplets. The fuel flows through inlet pipe 92 into the venturi, where it flows to the left along with the inlet air 87, and through the pipe 88 turning axially upstream. In the passage of the fuel 154 and air up to the upstream end 89 of the fuel pipe, there is vaporization of the liquid fuel because the pipe passes through the combustion zone, and the fuel is heated. Thus the air and liquid droplets become a mixture of fuel vapor and air, which flows in accordance with arrows 94 out through the openings 154 in the central conical portion 86. Surrounding the conical portion 86 is a cylindrical portion 84, all of which is smooth and streamlined, forming, in effect, an annular venturi tube, through which the inlet combustion air 98 flows, and mixes with the vapor 94.

Shown in FIG. 7 is a liner 82 which is inside of and spaced from the housing 80. There is also a shorter section of liner 83 which is of smaller diameter than the liner 82, and extends farther upstream in the combustion chamber. Part of the entering air indicated by arrows 99 flows along the wall of the housing 80, in the space between the housing and the liner 82. Such flow is indicated by the arrows 90A. This air passage through the annular space between 80 and 82 provides some cooling effect for both the liner and the housing. Not shown, but at the end of the liner 82, the air 90A mixes with the products of combustion and dilutes and lowers their temperature prior to entering the turbine.

Another part of the air flow indicated by 99 passes outside of the liner 83 and inside of the liner 82 and flows along the inner surface of the liner 82 providing additional cooling to the liner 82 which is exposed directly to the hot flame of the combustion, and requires cooling effect to avoid being eroded by the flame.

Indicated on the top of the drawing are three brackets 168, 166 and 164. The bracket 168 indicates that section of the combustion chamber, in which there is mixing of the inlet air 98 and the mixture of air and fuel 94 issuing from the opening 154. The fuel and air mixture is ignited by a means 96 which is well-known in the art and needs no further description. In the vicinity of the device 96 there is ignition of the fuel and air mixture which is indicated by the zone 166. The bracket 164 indicate a combustion zone which extends from the point of ignition downstream toward the end of the combustion chamber.

While a very hot environment is needed for the complete combustion of the fuel with the entering air, in the combustion zone a relatively low velocity is needed to avoid blowing out the fire, and the chamber is designed to provide this through the pronounced divergence in the flow passage downstream from the venturi throat. The maximum temperature reached in the combustion zone is too high for the materials of construction of the turbine, and therefore prior to the introduction of the rapidly flowing hot gas into the turbine nozzles it is necessary to mix additional cooling air with the hot gases, in order to reduce the temperature to the point where the materials of construction of the turbine can withstand the temperature of the entering gases. Consequently, the flow of air 99 along the outer housing of the chamber and on both sides of the liner 82 and 83 serves to keep these cool while the air is flowing toward the downstream end of of the combustion chamber, prior to entering the turbine.

The axial portion of the combustion chamber is maintained at a high temperature by the combustion of the fuel, so that complete and efficient combustion can be obtained. The axial portion of the air flow indicated by the arrows 98 goes into the entering venturi space 162 and mixes with the fuel 94 in the combustion space.

As was mentioned previously, a portion of the entering air 97 goes into the venturi 90 in order to provide a suction to draw fuel droplets into the venturi and into the pipe 88, where it is mixed with the entering air 97. Because the pipe 88 passes through the hot combustion zone, the pipe is heated and the fuel vaporizes and mixes with the entering air so that when it issues from the openings 154 and is turbulently mixed with additional air 98, combustion can be carried on efficiently.

There are two additional features. A pipe 158 which enters through the side wall 80 and has a portion turned upstream along the lines of a total pressure probe.

There is air flow in accordance with the arrow 160 out of the pipe 158. The difference between impact pressure (pipe 158) and boost venturi pressure (tube 90) is a function of air flow rate. Also in the lower part of the diagram there is a pipe 94 which connects through the side wall 80 and enters the neck of the venturi tube 90. This provides another pressure connection with FIGS. 8A and 8B.

Reference is now made to FIG. 8A which comprises the apparatus for supplying liquid fuel to the combustion chamber. There is a housing 174 in the form of a vertical tank having a selected level of liquid fuel 176. This level can be maintained by any conventional means such as a float valve 178 or similar device. The fuel liquid enters in accordance with arrow 182 through a pipe 176 in the top of the tank, under pressure, and is metered into the tank in accordance with the level of the liquid 176. There is a pipe connection 158 into the air space above the liquid. This pipe 158 connects to the corresponding pipe of FIG. 7 which is the total pressure probe, and the difference in the pressure of the air entering the chamber 174 in accordance with arrow 160 through pipe 158 and the pressure in the throat of the boost venturi 90 is a function of the mass flow of the air in accordance with arrows 99.

Near the bottom of the housing 174 is an outlet connected to pipe 92, which provides fuel in accordance with arrow 150 to the corresponding pipe 92 of FIG. 7, into the venturi tube and pipe 88, and then into the combustion chamber.

It has been explained previously how at reduced loads the supply of air to the compressor is controlled at the inlet to the compressor. Consequently, at reduced load the flow of air as indicated by arrows 99 will be of reduced velocity and quantity, therefore the pressure indicated by the total pressure probe 158 and exerting a pressure in FIG. 8A on top of the liquid surface 176, will exert a reduced pressure on the fuel liquid, and the flow pipe 92 into the combustion chamber. The pressure in the boost venturi throat will tend to increase. In other words, the pressure forcing liquid into the combustion chamber is controlled by the flow of air into the combustion chamber from the compressor, so that as the load varies so does the flow of air and so does the flow of fuel. Therefore the combination of the simple fuel delivery system of FIG. 8A in combination with the combustion chamber of FIG. 7 and the mechanical features of the compressor and the turbine previously described, make for an operating system such that when the load is reduced, the flow of air is reduced, the flow of fuel is reduced, the cross-sectional inlet of hot gas into the turbine is reduced, thus maintaining the high rotational velocity of the turbine and compressor rotors, and highly efficient operation for varying loads, from the maximum down to a selected minimum.

Figure 8B:
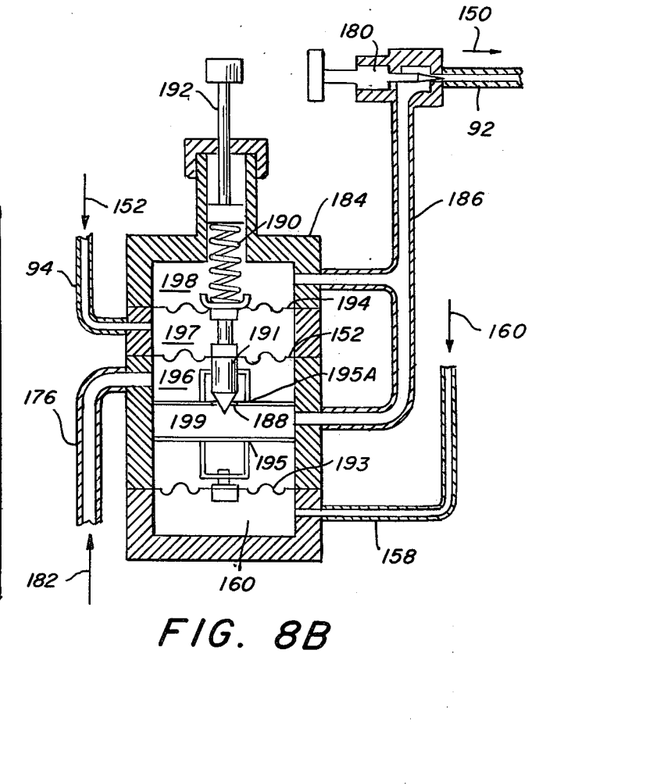

So far as fuel supply to the combustion chamber is concerned, the simple system of FIG. 8A is ideal for a stationary turbine system. However, for a moving system and particularly for a system in which the orientation of the engine can be altered, such as in an airplane, where a static level of liquid fuel can not be maintained a more complex type of fuel delivery system such as indicated in FIG. 8B is provided. This fuel supply system involves a housing 184 having multiple chambers 160, 196, 197 and 198. These are separated by flexible diaphragms 193, 152, and 194.

The zone 160 is connected by pipe 158 to the total pressure probe indicated in FIG. 7 and the difference in pressure between chamber 160 (total pressure) and chamber 197 (boost venturi) corresponds to the rate of flow of air. The pipe 176 as indicated in FIG. 8A, supplies the fuel in accordance with arrow 182, under a selected pressure. This goes to chamber 196. The chamber 197 is connected by pipe 94 to the venturi 90 as shown in FIG. 7, and the chamber 198 is connected to the outlet fuel supply 186, which is also connected to a space 199, which is separated from the space 196 by a diaphragm or plate 195A which has a central opening 188 into which projects a tapered axial needle, so that relative movement of the rod and the plate 195A meters the flow of fuel from pipe 176 into space 196, through the orifice 188, and into the pipe 186, and through a manual needle valve control 180 to pipe 92 and the fuel connection to the venturi tube of FIG. 7.

In this assembly the pressure differential between the total pressure developed by the total pressure probe tube 158 and the connection to the venturi throat by pipe 94 into chamber 197 provides a force which is opposed by the pressure of the metered fuel in space 196, plus the force of calibrating spring 190. These forces determine the position of the needle 191 in the orifice 188 and this in turn controls the pressure of the metered fuel. Proper orifice design and spring selection will result in a fuel flow in a substantially constant specific ratio to combustion chamber air flow, over a wide range of air flows. An additional metering orifice indicated by needle valve 180 may be added downstream if desired to perform various functions, such as speed control.

Figure 9:
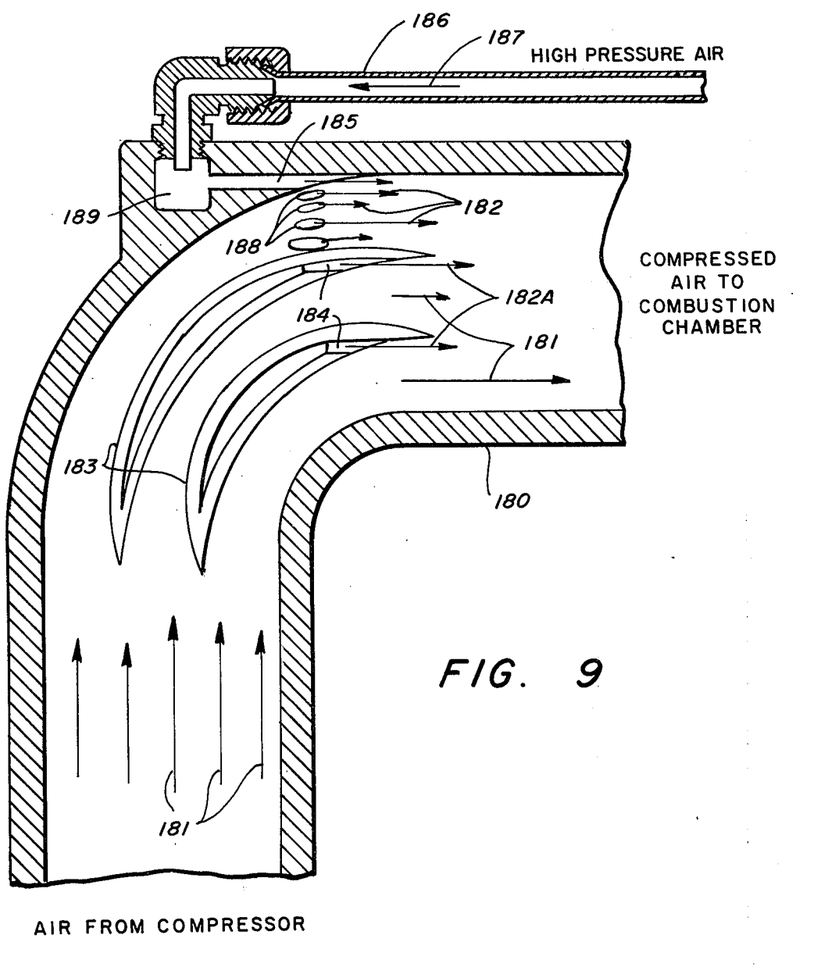
FIG. 9 illustrates the injection of high pressure air into the combustion chamber to accelerate the turbine rotor and the output shaft.

Referring now to FIG. 9, there is shown a portion of the conduit 180 which connects the compressed air outlet of the compressor to the inlet of the combustion chamber.

For gas turbines in general, acceleration under load tends to be sluggish. Rotor speeds are high. This results in high levels of rotating inertia. Maximum temperature restrictions plus flow reversal or surge phenomena, sharply restrict the rate at which fuel flow can be increased to produce acceleration. These limitations are much less of a problem in a variable air flow engine such as the one described in this application. However, even here a system of improving acceleration response may be of significant value under certain highly demanding operating conditions.

The acceleration is aided by air stored in a tank, pressurized to the desired level, by engine compressor bleed air, plus possibly a booster pump. When rapid acceleration is required the air is injected into the engine duct system between the compressor outlet and the combustion chamber, in a direction roughly the same as normal air flow. This causes an immediate increase in engine air flow mass and velocity, plus disruption of much of the semi-stagnant boundary layer. The result is an accelerating impulse without the tendency to surge which is common by conventional methods of acceleration. By the use of air injection the acceleration can be carried out much more rapidly and this permits rapid assumption of sudden load increases by the engine.

In the conduit 180 where the compressed air flows as indicated by arrows 181, there are a number of nozzles or openings 188 in the wall of the conduit. This can best be provided by having a bend in the conduit and an annular manifold 189, so that drilled holes can be provided such as 188. High pressure air from an accumulator (not shown) flows in accordance with arrow 187 through an inlet pipe 186 to the manifold 189, from which it flows through holes 185 to the openings 188 and emerges in accordance with arrows 182.

In addition, there may be internal flow straightening vanes such as 183, which are curved in accordance with the curvature of the conduit 180. These may be cast hollow as shown and have openings 184 similar to 188 through which the compressed air 187 may be provided in accordance with arrows 182A.

Normally the compressed air from the compressor flows in accordance with arrows 181 around the curve of the conduit and into the combustion chamber.

When a sudden load increase is required the input throttle to the air compressor is opened to permit more air intake. In addition, this high pressure air 187 is injected into the conduit 180 and into the combustion chamber. This sudden increased mass flow of air serves to draw in additional fuel and so provide a sudden increase in the flow of hot gases into the turbine and therefore causes an acceleration of the turbine system such as to carry on the additional load without a dip in rotational speed.

Now shown but part of the gas turbine engines are pumps such as for fuel and for lubricant. Depending on the engine and the application, other pumps, such as hydraulic and lubrication scavenge are sometimes required. In general practice these are rotary pumps of various designs driven at a fraction of turbine shaft speed through reduction gears. It is proposed to replace these rotary pumps with reciprocating pneumatic driven units — either rotary or reciprocating. Power to operate the motor would come from the compressed air generated by the compressor and from the engine compressor outlet. Normal practice would be to integrate all the pumps required for an engine into a single package using a single pneumatic motor.

Using a separate pneumatically operated pump system eliminates reduction gears which are expensive, require lubrication, add weight and bulk, and are subject to wear and failure. A separate pneumatically operated pump system can be located almost anywhere in the general vicinity of the engine. This flexibility is particularly advantageous with aircraft engines, including jets, where conventional pump drive arrangements are frequently difficult to integrate into the desired engine envelope, and the resulting design frequently is an expensive but less than fully satisfactory compromise.

Both rotary and reciprocating pneumatic motors and pumps can be designed to be relatively light weight and still operate at low enough loads and speeds to provide exceptional endurance and reliability. Reciprocating pumps tend to be more effective than rotary pumps for gas compression purposes. This is an advantage where gaseous fuels are used, where high pressure air is needed and where compression of gaseous refrigerants is involved.

Conventional turbine design consists among other things, of various equally spaced rotating elements in close proximity to each other and to equally spaced stationary elements. Examples are compressor rotor vanes and diffuser vanes, turbine wheel vanes and nozzle vanes. The result is vibration and noise at a frequency which is a function of the number of elements involved, their spacing, and the speed of the engine.

Element spacing can be varied within certain limits without degrading engine performance. The use of variable spacing on the major vibration and noise producing components will result in overlapping production of a number of lower frequencies at substantially lower amplitudes. The variable spacing will therefore result in reduced engine noise output. This in turn will allow the use of smaller and less expensive silencing systems with reduced performance penalty. The scattering of vibration frequencies and reduction of their amplitudes, will result in improved engine component life and reduced maintenance requirements.

While the fuel supply for the combustion chamber has been indicated as a liquid fuel and the corresponding fuel supply devices have been so designed, it will be understood that the combustion chamber can operate equally well with gaseous fuel, wherein the control would likewise be maintained proportionate to the air flow, as in the case of the devices in FIGS. 8A and 8B.

What has been described is a design of turbine engine having a number of novel features including:

1. A means of power control by control of the amount of air supplied to the compressor, and by control of the area of inlet of hot gases to the turbine nozzles.
2. A design of efficient combustion and air flow into the combustion chamber.
3. A system of air cooling of the critical portions of the combustion chamber.
4. A system of drawing in cool outside air into the operating portions of the turbine in order to cool critical parts, and to maintain an operating temperature below a critical point dependent upon the type of materials of construction.
5. Novel designs of fuel supply devices in which the control of quantity of fuel is maintained in substantially constant ratio to the supply of combustion air to the combustion chamber. 6. Novel means of providing rapid acceleration of the engine.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

In the claims:

1. A gas turbine engine, comprising:
 a. a rotary air compressor, having a stator with an air inlet, a substantially circular outlet air duct, and a compressor rotor said compressor including an axial air inlet for said compressor comprising the annular space between an inner cylinder, coaxial with said rotor shaft, and an outer flared coaxial cylindrical wall, and including means to adjustably partially close off said annular opening;
 a' variable angle pre-whirl vanes in the inlet of said compressor;
 b. a gas turbine having a stator with a substantially circular hot gas inlet duct, a gas outlet and a turbine rotor and means to control the cross-section for flow of hot gases to said turbine rotor;
 c. a housing having a rotor shaft journalled in said housing, said compressor rotor mounted on a first end of said rotor shaft, and said turbine rotor mounted on the second end of said rotor shaft;
 d. substantially cylindrical combustion chamber means connecting the end of said compressor outlet air duct to the inlet end of said turbine hot gas inlet duct;
 e. a tubular extension of said housing in which is positioned the support bearing for said second end of said rotor shaft on which said turbine rotor is mounted;
 f. said circular hot gas inlet duct for supplying hot gas to the turbine inlet nozzles surrounding said tubular extension with an annular clearance therebetween; and
 g. auxiliary blade means on the back surface of said turbine rotor to draw cool outside air axially through said annular clearance, and radially along the back surface of said turbine rotor, and into said turbine nozzle along with said hot gases from said hot gas inlet duct;
 whereby said tubular extension, the turbine nozzle and said turbine rotor are cooled by said cool air flow.

2. The engine as in claim 1 including a plurality of bored longitudinal openings in the hub of said turbine rotor, and means to flow part of said cool outside air flowing through said annular space, through said bored longitudinal openings;
 whereby the hub of said turbine rotor is cooled.

3. The engine as in claim 1 in which said means to adjustably partially close off said annular opening comprises a conical wedge, and means to position said wedge at a selected point along said inner cylinder.

4. The engine as in claim 1 including means to throttle the flow of hot gases through said turbine inlet nozzles, comprising:
 a. backing plate means supporting a plurality of nozzle blades mounted on and substantially perpendicular to said backing plate means;
 b. axially movable shroud means substantially parallel to said backing plate means;
 c. said shroud means having appropriate flare so as to direct axially flowing hot gas into a radial direction through said nozzles; and
 d. a plurality of openings cut in said shroud each of the shape of one nozzle blade, and means to move said shroud axially;
 whereby said blades fit into said openings and the spacing between said shroud and said backing plate is changed, thereby changing the area of opening for flow of said hot gas to said turbine rotor.

5. A gas turbine engine, comprising:
 a. a rotary air compressor having a stator with an air inlet, an outlet air duct, and a compressor rotor and means to control the rate of flow of inlet air to said compressor;
 b. a gas turbine having a stator with a hot gas inlet duct, a gas outlet, and a turbine rotor including vane means on the back of said turbine rotor to draw in outside air to cool the compressor housing and the turbine rotor;
 c. a housing having a rotor shaft journalled in said housing, said compressor rotor mounted on a first end of said rotor shaft, and said turbine rotor mounted on the second end of said rotor shaft; and
 d. a substantially cylindrical combustion chamber means connecting the end of said compressor outlet air duct to the inlet end of said turbine hot gas inlet duct comprising:
1. a cylindrical housing, including means to flow air under pressure from said compressor into said housing at one end and means to deliver hot gases at high velocity at the second end of said housing to said turbine;
2. a conical structure along the axis of said housing, and means to inject fuel in a generally downstream direction from the downstream end of said conical structure;
3. a cylindrical flared structure surrounding said conical structure providing an annular venturi-shaped space between the two, whereby a major part of the air supply from said compressor passes through said annular space at high velocity and turbulently mixes with said fuel;
4. means to ignite the fuel-air mixture;
5. a thin walled cylindrical liner inside of said housing, and means to direct part of the input air from the compressor to the annular space between said liner and said housing, whereby said liner and said housing are cooled; and
6. a venturi tube and means to direct part of the input air from said compressor into said venturi tube, a fuel line connected to supply fuel to the neck of said venturi, pipe means connecting the outlet of said venturi tube to the downstream end of said conical structure, whereby said fuel and said air, flows through said pipe, and are discharged at the downstream end of said conical structure;

whereby the rate of flow of fuel is controlled by the rate of flow of air through said venturi tube, which is a function of the total flow of compressor air to said combustion chamber.

6. The gas turbine as in claim 5, including:
a pressure tube directed upstream into the flow of inlet air, conduit means connecting said pressure tube to a closed chamber containing liquid fuel, and outlet pipe means from said closed chamber for conducting fuel to said venturi tube, whereby the flow of fuel out of said chamber will be a selected function of the difference in pressure in said pressure tube and that in the venturi tube and of the rate of flow of air into said combustion chamber.

7. The gas turbine as in claim 5 including:
a first pressure tube directed upstream into the flow of inlet air, and providing a control pressure $P_1$, a second tube connected to the throat of said venturi tube and providing a control pressure $P_2$, and liquid fuel supply means for providing a flow of liquid fuel to said combustion chamber which is a function of the difference between said pressures $P_1$ and $P_2$.

8. The gas turbine as in claim 1 in which said turbine rotor comprises:
   a. a hub portion of generally tapered, curved, conical shape;
   b. a plurality of P radial vanes equally spaced about said hub portion, said vanes extending an axial distance D from the back surface of said hub, namely the part of largest diameter;
   c. said hub portion beyond said axial distance D turned down to a cylindrical portion of lesser diameter H, for an additional distance; and including
   d. at least a first sub hub having a central opening of diameter H, adapted to fit over said cylindrical portion, said first sub hub having a plurality of P vanes machined at a helical angle $\theta$. and adapted to line up with said P vanes on said rotor.

9. The gas turbine as in claim 8 including:
at least a second sub hub having P vanes machined at a helical angle $\theta_2$ which is greater than $\theta_1$.

10. The gas turbine as in claim 8 in which said radial vanes are inserted into corresponding slots in said hub portion.

11. The gas turbine as in claim 1 including:
means to meet air under high pressure into the inlet of the combustion chamber, whereby the increased flow of hot gas from the combustion chamber into the turbine will cause the turbine rotor to accelerate.

12. The engine as in claim 5 including variable angle pre-whirl vanes at the air inlet of said compressor controlling the helical angle of flow of inlet air to the blades of said compressor rotor.

13. The engine as in claim 1 in which the means to control the power output comprises:
   a. means for varying the cross-sectional area of the air inlet to the compressor; and
   b. means for varying the angle of pre-whirl supplied to the incoming air to the compressor.

14. The engine as in claim 13 in which the means to control the power output includes:
   c. means for varying the cross-sectional area for flow of hot gases to the turbine rotor.

15. The engine as in claim 14 including means responsive to the rate of flow of compressed air from the compressor to said combustion chamber to control the rate of flow of fuel to the combustion chamber.

* * * * *